UNITED STATES PATENT OFFICE.

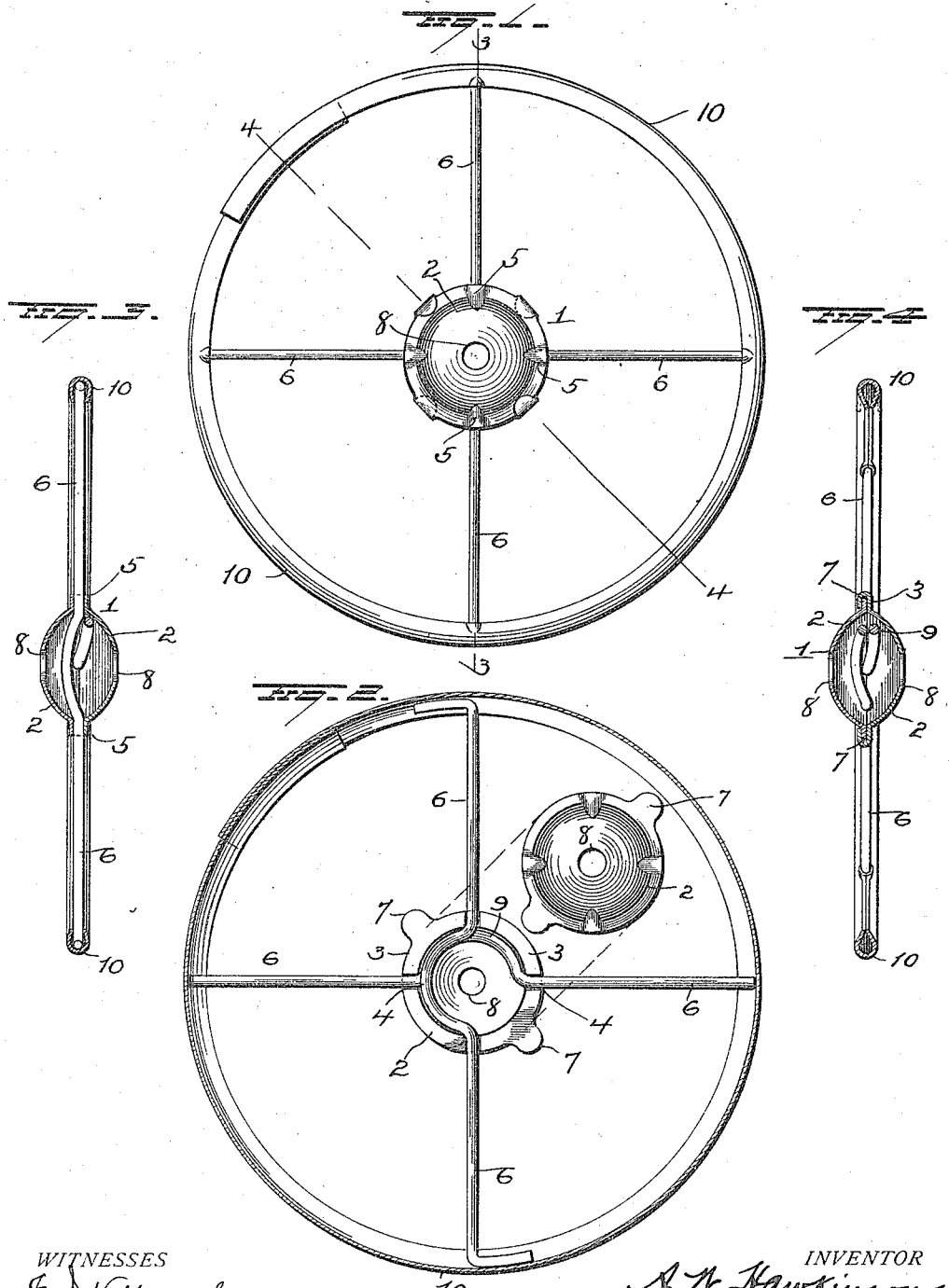

AXEL W. HAWKINSON, OF WASHINGTON, PENNSYLVANIA, ASSIGNOR TO TOPLIFF-ELY COMPANY, OF WASHINGTON, PENNSYLVANIA, A CORPORATION OF PENNSYLVANIA.

WHEEL.

1,184,852. Specification of Letters Patent. Patented May 30, 1916.

Application filed October 12, 1915. Serial No. 55,494.

*To all whom it may concern:*

Be it known that I, AXEL W. HAWKINSON, a citizen of the United States, and a resident of Washington, in the county of Washington and State of Pennsylvania, have invented certain new and useful Improvements in Wheels; and I do hereby declare the following to be a full, clear, and exact description of the invention, such as will enable others skilled in the art to which it appertains to make and use the same.

This invention relates to improvements in wheels and more particularly to such as are especially adaptable for use with children's carriages,—the object of the invention being to provide a metal wheel which shall be light in weight and yet substantial in construction and which may be cheaply and quickly manufactured without sacrificing efficiency.

With this and other objects in view, the invention consists in certain novel features of construction and combinations of parts as hereinafter set forth and pointed out in the claims.

In the accompanying drawings; Figure 1 is a view of a wheel embodying my improvements; Fig. 2 is a face view with one of the hub members removed, Fig. 3 is a transverse sectional view on the line 3—3 of Fig. 1, and Fig. 4 is a sectional view on the line 4—4 of Fig. 1.

1 represents the hub of my improved wheel and comprises two sheet metal members 2—2, each made dish-shaped or approximately hemispherical in form. The two hub members 2 are identical in form and are provided with peripheral flanges 3 having radial grooves 4. When the members of the hub are assembled, the peripheral flanges 3 of the respective members will lie one against the other, and the grooves 4 will coöperate to form sleeves 5 for the accommodation of spokes 6. Lugs 7 project at intervals from the flanged peripheral portions of the respective hub members,—the lugs 7 of each hub member being bent over the peripheral flange of the other hub member, and thus the two sheet metal parts which form the hub may be securely fastened together without the use of thimbles.

When the members of the hub shall have been assembled, a hollow sheet metal hub, approximately spherical in shape will be provided, and each hub member is made with an opening 8 for the accommodation of the axle spindle of the vehicle.

The hollow spherical hub 1 forms a housing for the inner portions of the spokes 6. These spokes are made of wire and a single piece of wire serves to provide two diametrically opposite spokes, the intermediate portion of said wire (which connects the inner ends of two spokes) being curved, as at 9 so as not to conflict with the axle spindle, and is housed within the hollow hub. The curved intermediate or connecting portions of the pairs of spokes serve also to impart more or less resilience to the spoke structure, and therefore to the wheel as a whole.

The outer ends of the spokes are connected with a sheet metal rim 10. In constructing this rim, the metal may first be made in channel form and then bent into proper circular shape with the ends of the channel strip telescoping. The circular channel strip, with the outer ends of the spokes projecting thereinto, will then be closed so that the rim will be approximately circular in cross section and when this shall have been accomplished, the spokes will be clamped, near their outer ends, between the edges of the inturned flanges of the channel.

Slight changes might be made in the minor details of the structure without departing from the spirit of my invention or limiting its scope and hence I do not wish to restrict myself to the precise details herein set forth.

Having fully described my invention what I claim as new and desire to secure by Letters-Patent, is:—

1. A wheel comprising a hollow hub, a rim, and pairs of spokes, each pair of spokes being constructed of a single piece of wire with its intermediate portion curved within the hub and the two spokes of a pair disposed approximately in longitudinal alinement with each other.

2. In a wheel, the combination with pairs of spokes, the spokes of each pair being disposed in longitudinal alinement, and made of a single piece of wire having the intermediate portion bent laterally, a hub housing the bent intermediate portions of the spoke wires, and a rim with which the outer portions of the spokes are connected.

3. In a wheel, the combination of a hub comprising substantially identical hollow members secured together, and pairs of spokes comprising wires each forming two diametrically opposite spokes, the intermediate portion of the wire connecting said spokes being curved and housed within the hollow hub.

4. In a wheel, the combination of a hub comprising two partly spherical members having abutting peripheral flanges, said flanges having grooves forming spoke sleeves, and lugs on each hub member engaging the other hub member.

5. In a wheel, the combination of a hub and spokes, said hub comprising two cup-shaped sheet metal members having abutting peripheral flanges, said flanges having grooves forming spoke sleeves, and each of said hub members provided with lugs on the flange, the lugs of one hub member overlapping the peripheral flange of the other hub member, whereby said hub members are secured together.

6. A wheel comprising a hollow hub, a channel sheet metal rim having its flanges bent inwardly, pairs of spokes having their outer end portions engaged by the edges of the channel rim, the spokes of each pair being in longitudinal alinement and constructed of a single piece of wire having its intermediate portion curved and housed within the hub.

In testimony whereof, I have signed this specification in the presence of two subscribing witnesses.

AXEL W. HAWKINSON.

Witnesses:
 GEO. W. WOLFE,
 L. R. STEWART.

Copies of this patent may be obtained for five cents each, by addressing the "Commissioner of Patents, Washington, D. C."